(12) United States Patent
Donaldson

(10) Patent No.: US 6,318,189 B1
(45) Date of Patent: Nov. 20, 2001

(54) DIGITAL TORQUE-RESPONSIVE PNEUMATIC TOOL

(76) Inventor: Robert D. Donaldson, 55 Turtlecreek La., Commerce, GA (US) 30530

( * ) Notice: Subject to any disclaimer, the term of this patent is extended or adjusted under 35 U.S.C. 154(b) by 0 days.

(21) Appl. No.: 09/440,732

(22) Filed: Nov. 16, 1999

Related U.S. Application Data
(60) Provisional application No. 60/108,965, filed on Nov. 18, 1998.

(51) Int. Cl.$^7$ ........................................................ G01L 3/02
(52) U.S. Cl. ........................................................ 73/862.335
(58) Field of Search ........................... 73/862.21, 862.22, 73/862.23, 862.24, 862.25, 862.331, 862.332, 862.333, 862.334, 862.335

(56) References Cited

U.S. PATENT DOCUMENTS

| | | | |
|---|---|---|---|
| 4,023,406 | * 5/1977 | Benz, Jr. | 73/862.24 |
| 4,265,108 | * 5/1981 | Wallace et al. | 73/862.21 |
| 4,333,220 | * 6/1982 | Aspers | 29/407.02 |
| 4,403,532 | * 9/1983 | Wallace et al. | 81/483 |
| 4,555,956 | 12/1985 | Reich . | |
| 4,616,512 | 10/1986 | Himmelstein et al. . | |
| 4,759,225 | * 7/1988 | Reynertson et al. | 73/862.21 |
| 4,805,404 | * 2/1989 | Dupin | 60/409 |
| 4,882,936 | 11/1989 | Garshelis . | |
| 4,899,598 | 2/1990 | Gumaste et al. . | |
| 4,939,937 | 7/1990 | Klauber et al. . | |
| 5,113,949 | * 5/1992 | Ohkubo et al. | 173/177 |
| 5,144,846 | 9/1992 | Klauber et al. . | |
| 5,146,790 | 9/1992 | Fish . | |
| 5,315,501 | * 5/1994 | Whitehouse | 364/152 |
| 5,412,999 | 5/1995 | Vigmostad et al. . | |
| 5,431,063 | 7/1995 | Yasui . | |
| 5,483,820 | 1/1996 | Nakamoto et al. . | |
| 5,567,886 | * 10/1996 | Kettner | 73/862.23 |
| 5,686,672 | 11/1997 | Klauber et al. . | |
| 5,703,298 | 12/1997 | Odachi et al. . | |
| 5,831,180 | 11/1998 | Tanaka et al. . | |
| 5,887,335 | 3/1999 | Garshells . | |

OTHER PUBLICATIONS

Sasada et al., "Noncontact Torque Sensor," 11$^{th}$ Annual IEEE Industrial Electronics Society Conference (Nov. 18–22, 1985).

* cited by examiner

Primary Examiner—Max Noori
(74) Attorney, Agent, or Firm—Peter S. Gilster; Greensfelder, Hemker & Gale, P.C.

(57) ABSTRACT

A portable, pneumatic torque tool automatically controls torque applied by it to a workpiece. In a portable hand-held housing, including a trigger control, a pneumatic motor provides an output shaft output shaft to a workpiece with which is associated a torque sensor within the housing for systematically measuring the amount of torque being applied by the shaft. A control module carried by the housing includes a keypad for providing a torque control input by which the operator selects a predetermined torque value. A torque control circuit interconnected with the torque control input and torque sensors operates to compare the torque being applied by the output shaft with the predetermined torque value. An air control within the housing includes a solenoid operating in response to the control module to prevent air from being supplied to the motor when the torque supplied by the shaft reaches the predetermined torque value, so the tool applies to the workpiece torque at substantially no more than the predetermined level.

5 Claims, 5 Drawing Sheets

DIGITAL TORQUE-RESPONSIVE PNEUMATIC TOOL

This application claims benefit of Prov. No. 60/108,965 filed Nov. 18, 1998.

BACKGROUND OF THE INVENTION

This invention relates to torque-responsive or torque-measuring tools and more particularly to a digital torque-responsive pneumatic tool, and specifically a torque-responsive, automatically torque-controlling digital pneumatic torque tool of portable character.

Pneumatic tools, i.e., air-powered tools, are widely used in automotive repair and maintenance. They also are used in manufacturing and assembly and in many other technical areas, as in marine repair and maintenance as well as also aircraft repair and maintenance.

Portable tools of the above type are often called pneumatic torque tools and also pneumatic torque wrenches. They are used selectively to apply torque (i.e., a twisting moment) to a bolt, screw, stud, nut, or other fastener, or joint, such as shear joints and tensile joints. Any and all of the foregoing elements subjected to torque are in this description referred to for convenience as "workpiece." For example, in automotive repair and maintenance (which may simply be referred to in this description as "automotive use") pneumatic torque wrenches may be used to secure various kinds of fasteners. An example is the use of portable pneumatic torque wrenches used to tighten and untighten lug nuts, which fasten a wheel to a wheel flange, as during installation or replacement of wheels.

In these various kinds of uses, the user typically desires to be able to apply a desired torque to the workpiece, which often can presently only be measured by the use of a calibrated torque wrench. The user specifically needs, and surely would like to be able, to measure the torque actually applied to a workpiece, as the torque is being developed by the tool. Thus, various manual torque tools are used, including click wrenches, dial wrenches, bending beam wrenches, and torque limiting wrenches, which may indicate a predetermined torque by detent disengagement or "break" action. When using pneumatic torque wrenches, which are notable for their speed and convenience as compared to the foregoing manual torque tools, the user most preferably surely would like to control use of such wrenches so that a workpiece, whether a nut, screw or other object, will be tightened only to a predetermined torque, as by automatically controlling the supply of air to the tool.

Present pneumatic torque wrenches sometimes are misused when applying fasteners for vehicle wheels, namely wheel lug nuts or wheel screws, for example. Therefore, it is common to encounter a problem of the lug nuts being too tight to be removed by vehicle users. There can also be a serious problem of stretching of lug nuts or wheel screws from over-tightening, which weaken the lug nuts and present a risk of stress fatigue and failure resulting from exceeding elastic limits of steels and other alloys from which these fastening elements are formed, or structures into or upon which they must be threaded. Among the various problems which can result from applying excessive torque to a workpiece are nut dilation, stud or fastener stretching or creep, embedment, galling, plastic deformation, and excessive torsional or tensile train strain.

To limit torque applied by pneumatic torque wrenches, tools have been equipped with air controls, which, by limiting air pressure provided to an air motor of the tool, can provide some approximate measure of torque control. But, in fact, an arrangement for merely limiting air flow does not provide sufficient precision of control, absent the use of feedback or other torque sensing by which the actual torque being developed by the tool is measured while torque is being applied.

In continuous drive industrial tools in which torque is to be controlled precisely, as during the manufacture of engines, it has been known to provide a system in which a torque reaction is provided either by an operator or a fixture. Such systems have characteristic problems, and also may cause operator fatigue or repetitive stress injury. Discontinuous drive tools have also been proposed which use a pulse mechanism; but they do not automatically control the application of torque. Rather, discontinuous drive tools attempt to limit torque through a pulsing action. They do not offer a wide range of setting of preset torque, and may not prove accurate, and may be difficult to audit.

Another type of industrial tool used to apply torque to a workpiece has used electronic sensors, for example as incorporated in torque transducer accessories which may be interposed between a power tool and workpiece or fixture, and which can sense and electronically measure the degree of torque being applied to the workpiece. In one such sensor arrangement, it has been known to use multiple coils about a rotating torque-applying shaft, which measure torque by sensing magnetostrictive forces developed in the shaft. The shaft is prepared with a ferrite coating by using chemical vapor deposition or plasma spray to deposit ferritic material on regions of the shaft. By combining exciter and sensor coils spaced along the shaft over the ferrite-coated portions of the shaft, differential sensing of magnetostrictive changes produced in the coated regions in response to the development of torque is used to generate a signal which represents the magnitude of torque developed. Circuits responsive to the torque signal are then used to control the torque-producing motive force applied to the shaft, and thereby control the torque delivered to a workpiece by the shaft. Such a system is both complicated and expensive to manufacture; and thus not been practically usable for pneumatic torque wrenches of portable type such as are used by automotive repair and maintenance facilities, tire installers/repairers, and other users who require portability and economy in a pneumatic tool.

SUMMARY OF THE INVENTION

It is in view of the above problems that the present invention was developed; a pneumatic drive tool with torque adjustment capability, digital display of desired torque settings, actual torque achieved display, torque measuring capability and automatic shutoff at a predetermined torque level. The primary function of the tool provides repeatable and accurate torque application without regard to operator capability or operating environment.

Among the several features, objects and advantages of the present invention are the provision of an improved pneumatic torque-applying tool, specifically a pneumatic torque wrench of portable character, which:

controls applied torque precisely by electronically sensing torque during operation;

controls the delivery of air to the tool in response to sensed torque during operation;

causes torque to be prevented from substantially exceeding a predetermined level;

allows convenient operator selection of the predetermined torque level and displays the predetermined torque level;

does not require external sensing and control circuits but are instead integrated completely into the tool;

provides for torque sensing and torque control by electronic feedback and electronically-initiated airflow control;

does not require an external source of electrical power but is instead capable of long-term use solely under battery power;

can be integrated into typical configurations of pneumatic torque wrenches by use of sensing and control elements which will not interfere with normal speed and convenience of operation of the pneumatic torque wrench;

uses a torque-sensing technology of such significant economy and relative simplicity as to make possible for the first time a generation of portable digital torque-responsive, torque-controlling pneumatic tools;

provides such torque-responsive, torque-controlling pneumatic tools with such economy and simplicity as to be suited for automotive repair and maintenance, manufacturing and assembly, as well as many other technical areas, including marine repair and maintenance and including also aircraft repair and maintenance; and provides high precision in use by automatically limiting torque applied by a pneumatic torque wrench to a precise, preset value with excellent repeatability and reproducibility.

Briefly, a torque-responsive, automatically torque-controlling digital pneumatic torque tool of portable character, includes or comprises or constitutes or consists essentially of:

a portable housing for hand-held use;

a pneumatic motor within the housing for being powered by a source of pressurized gas, an output shaft from the motor, and a coupling at a forward portion of the output shaft for coupling torque from the output shaft to a workpiece to which it is desired to apply torque to a predetermined torque value by rotation of the output shaft;

a motor control within the housing having a trigger for permitting an operator to selectively supply gas from a source to the motor for its operation;

a torque sensor within the housing and associated with the output shaft for systematically measuring the amount of torque being applied by the shaft;

a torque control input carried by the housing permitting the operator to select a predetermined torque value;

a torque control circuit interconnected with the torque control input and the torque sensor operating to compare the torque being applied to the output shaft with the predetermined torque value; and an air control within the housing operating to prevent pressurized gas from being supplied to the motor by the motor control when the torque supplied to the shaft reaches the predetermined torque value;

whereby the tool applies to the workpiece torque at substantially no more than the predetermined level.

By way of simple explanation of physical principles, the output torque of the tool is directly measured on the shaft of the tool through induced changes of magnetic permeability within the material components of the shaft. Two distinct bands or magnetic permeability regions are provided to provide opposite magnetic responses when the shaft of the tool is delivering torque to the workpiece. When an equal strength external magnetic field is produced around these regions through exciter coils, one region will be more permeable to the magnetic field while the other will be less permeable to the magnetic field. The magnetic field caused by the exciter coils induces a corresponding differential in electrical current in respective sensing coils placed near the exciter coils. Thus, the differential in the magnetic field caused by the changed magnetic permeability of the shaft regions resulting from torque developed in the shaft in turn causes a differential in the electric current induced by the sensor coils.

Using an analog-to-digital converter, an oscillator and amplifiers, the differential in the sensed signals is transferred to a microprocessor and measured against a signature algorithm unique to each manufactured shaft. The microprocessor also receives the desired torque level through an input signal generated by the user before the tool is operated. When the predetermined torque level is reach, the microprocessor sends an output signal that energizes a solenoid which cuts off the pressurized air supply to the tool.

Other objects, advantages and features will be in part apparent and in part pointed out herein below.

BRIEF DESCRIPTION OF THE DRAWINGS

Corresponding reference characters indicate corresponding parts throughout the drawings.

DESCRIPTION OF PRACTICAL EMBODIMENTS

Figure 1:
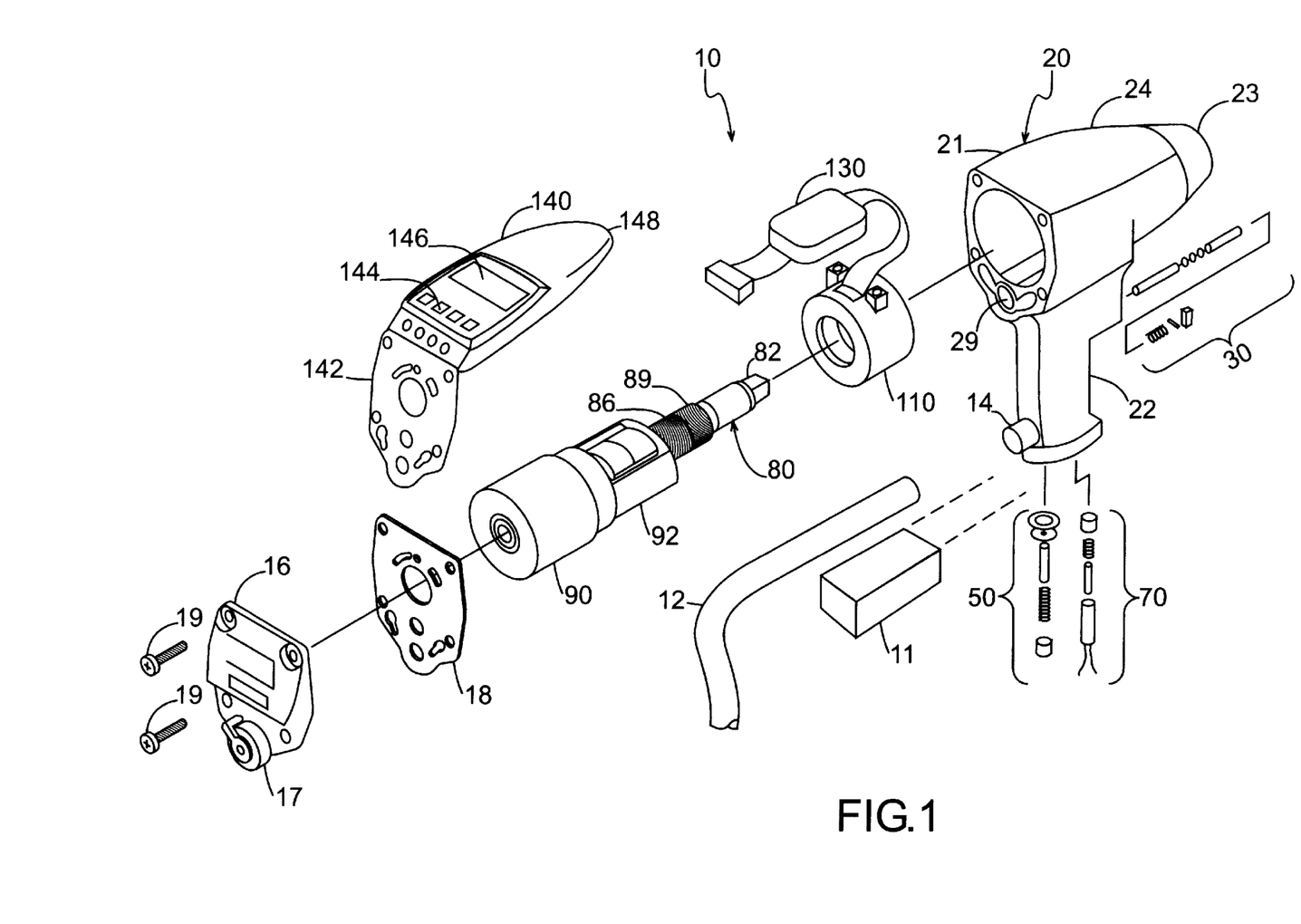
FIG. 1 is an exploded view of a digital torque-responsive pneumatic tool, specifically an pneumatic torque wrench with automatic torque limiting features, in accordance with and embodying the present invention.

Referring to FIG. 1, a pneumatic torque wrench of the present invention is designated in its entirety at 10. Tool 10 consists primarily of a main housing 20, a spindle shaft 80, a reversible air motor 90, a trigger assembly 30, a tip valve assembly 50, a solenoid assembly 70, a magnetostrictive sensor assembly 110, a control module 130 and a keypad and display assembly unit 140. Tool 10 is supplied with pressurized air by an air hose 12, which is releasably connected to an air coupling 14 at a lower end of handle 22, which includes a trigger button 31, which, when squeezed, opens tip valve 52, providing air from hose 16 to air motor 90, for driving shaft 80, for delivering torque to a workpiece (not shown), such as by a socket wrench for engaging a nut, screw, fastener or other workpiece.

As is more fully explained below, a user of tool 10 inputs a predetermined torque level to display and key pad assembly unit 140, which is in turn read by and stored in control module 130. As tool 10 is used to torque a workpiece, the user depresses trigger button 31, allowing pressurized air to drive motor 90 and, in turn, shaft 80. Magnetostrictive sensor assembly 110 systematically measures changes in a induced magnet field resultant from changes in the magnetic permeability of shaft 80 in regions A and B, caused by the torque applied to the workpiece and, on a preset intermittent basis, sends voltage signal Vi to control module 130, which in turn samples Vi against a precalibrated signature curve that has been permanently stored in the ROM of a processing integrated circuit in control module 130. When the predetermined torque level is achieved to the workpiece via shaft 80, control module 130 sends an electronic signal Vo to energize solenoid 72, which causes trigger assembly 30 to collapse, forcing tip valve 52 to close, shutting-off the airflow to air motor 90.

As is best shown in FIG. 1, main housing 20 is a conventional pistol-grip pneumatic tool casing well known to those in the industry consisting primarily of tool casing 21 and handle 22, and is preferably made of a high density molded plastic or other suitable material. Tool casing 21 is generally hollow for receiving and housing shaft 80, magnetostrictive sensor assembly 10, control module 130, air motor 90, and impact assembly 92. Bushing 23 is fixed to casing 22 in nose section 24 of casing 21 for rotatably receiving shaft 80 along its longitudinal axis when installed within casing 22, and acts as a bearing for shaft 80 when tool 10 is in operation.

Control valve plate 16 acts to, among other things, cap or close up casing 22 when tool 10 is in final assembled form. Control valve plate 16 further functions to direct and control pressurized air from air hose 12 to air motor 90 as is more fully explained below. Control valve plate 16 is of a conventional type well known to those in the industry, and abuts gasket 18. When tool 10 is in final assembled form, gasket 18 is sandwiched between control plate 16 and flange 142 of keypad 140 which in turn abuts casing 21, as is shown in exploded form in FIG. 1. As assembled, control valve plate 16, gasket 18 keypad flange 142 and casing 21 are held together in place by screws 19.

Defined within control valve plate 16 is control valve 17, which is of a conventional type well known in the industry. Control valve 17 acts to regulate the flow of pressurized air to air motor 90, thereby acting as a limiting factor to the speed at which air motor 90 operates and drives shaft 80. It is conceived that control valve 17 will have three speed settings: low, medium and hi. The user will set control value 17 on the speed setting corresponding to certain torque levels. For instance, lower desired torque levels would require the user to adjust control value 17 to the low setting. Gasket 18 has defined within it a number of apertures, which, in combination with control valve 17, acts to limit the speed and control the direction of air motor 90.

Figure 2:
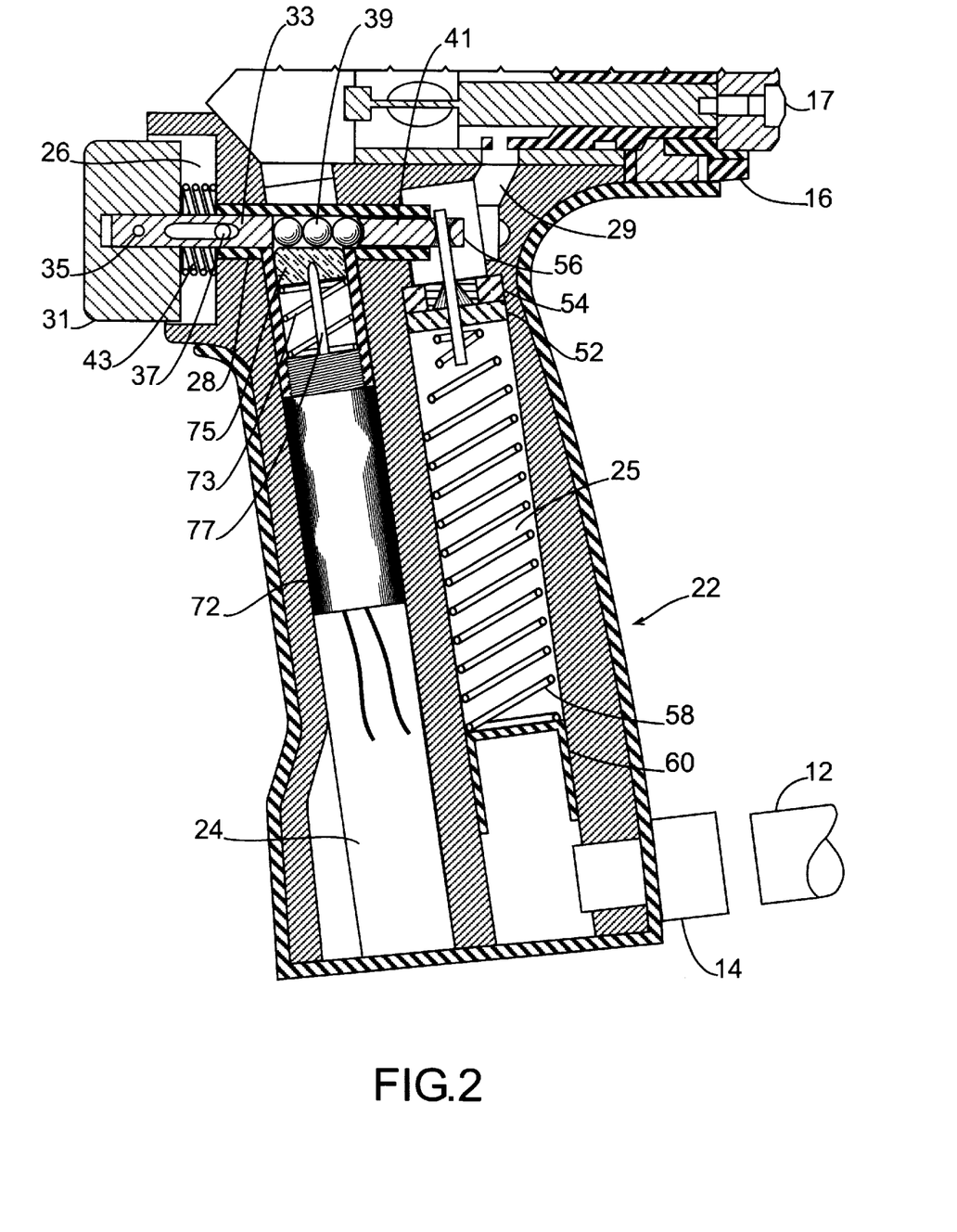
FIG. 2 is a partial cross-sectional view of the tool of FIG. 1 showing the trigger assembly, solenoid assembly and air passages of the tool's handle.

As is best shown in FIG. 2, handle 22 has defined within it a number of hollow members and passages including, but not intended as a limitation, solenoid bore 24, air supply bore 25, trigger recess 26, trigger stem bore 28, and air passage 29. Solenoid bore 24 is a generally vertical cylindrical recess for containing solenoid 72.

Air bore 25 is, similarly, a generally vertical cylindrical recess in handle 22 and is positioned generally parallel to solenoid bore 24. Air hose 12 is releasably attached to air bore 25 by coupling 14, which is of a conventional quick-release design well known to those in the industry. Air bore 25 further communicates with and is connected to air passage 29 through tip valve 52. Accordingly, air bore 25 acts to supply pressurized air from air hose 12 to air passage 29.

Again referring to FIG. 2, tip valve assembly 50 consists primarily of tip valve 52, valve seat 54, valve stem 56, spring 58 and stop 60. Stop 60 is fixably attached to handle 22 in the lower portion of air bore 25. Spring 58 is preferably a resilient metallic coil spring extending vertically upwards within air bore 25 from stop 60. Spring 58 is sized such that its function is not impaired by the diameter of air bore 25 and such that spring 58 does not significantly inhibit the flow of pressurized air through air bore 25. The upper end of spring 58 is biased against the lower surface of tip valve 52, which is a circular disc having a small aperture defined in its center for receiving valve stem 56. Tip valve seat 54 is fixably attached to handle 22 in the upper portion of air bore 25 such that spring 58, while biased against stop 60, forces tip valve 52 to bear against and become seated to valve seat 54.

As is best shown in FIG. 1, air passage 29 further communicates with air control plate 16 through control valve 17 when tool 10 is in final assembled form such that any pressurized air flowing through air passage 29 from hose 12 is directed through control valve 17. Accordingly, coupling 14, air bore 25, air chamber 29, control valve 17, and gasket 18 form a continuous conduit allowing pressurized air from air hose 12 to drive air motor 90 when tip valve 52 is in an open position.

Trigger stem bore 28 is a generally horizontal cylindrical recess, preferably with a smaller diameter than solenoid bore 24 or air bore 25, which communicates with solenoid bore 24 and air bore 25. Solenoid bore 24 abuts with and joins trigger stem bore 28 such that items maintained in trigger stem bore, such as release balls 39, may fall from trigger stem bore 28 into solenoid bore 24. As is shown below, certain portions of trigger assembly 30 are slidably received within trigger stem bore 28.

Referring to FIG. 2, solenoid assembly 70 consists generally of extensibleretractable solenoid member 72, release plunger 75, solenoid rod 77 and solenoid return spring 73. Solenoid rod 77 is at one end fixed to the upper surface of solenoid member 72, and pivotally attached to release plunger 75 at the other. Solenoid member 72 is fixably attached to handle 22 in solenoid bore 24 such that the upper surface of release plunger 75 defines the lower surface of trigger stem bore 28 (where it communicates with solenoid bore 24) when solenoid member 72 is fully extended.

Extension and retraction of solenoid member 72 is controlled by control module 130, which sends an electronic signal Vo to solenoid member 72 when the predetermined torque setting has been reached by the shaft 80, as further explained below. When nonenergized, solenoid member 72 is in its fully extended position, holding release plunger 75 at the lower limit of trigger stem bore 28. When energized, solenoid member retracts, pulling solenoid rod 77 and release plunger downwardly.

Trigger assembly 30 consists primarily of trigger button 31, trigger stem 33, release balls 39, stem 41 and trigger spring 43. Trigger button 31 is slidably received within trigger recess 26 and is attached to trigger stem 33 by pin 35. Trigger button spring 43 is preferably a resilient metallic coil spring fixably attached to housing 20 in trigger recess 26, is received around trigger stem 33 and resiliently bears against the rear surface of trigger button 31. Trigger stem 33, release balls 39 and stem 41 are slidably received within trigger stem bore 28, and the horizontal movement of trigger assembly 30 is limited by grooved pin 37.

When trigger 31 is depressed by a user of tool 10, the corresponding horizontal movement of trigger stem 30, release ball 39 and stem 41 within trigger stem bore 28 causes stem 41 to bear against tip valve stem 56, which in turn causes tip valve stem 56 to move horizontally, and move tip valve 52 vertically downward from valve seat 54. Movement of valve 52 away from valve seat 54 thereby allows pressurized air from air bore 25 to pass into air chamber 29 and in turn drive air motor 90.

Figure 3:
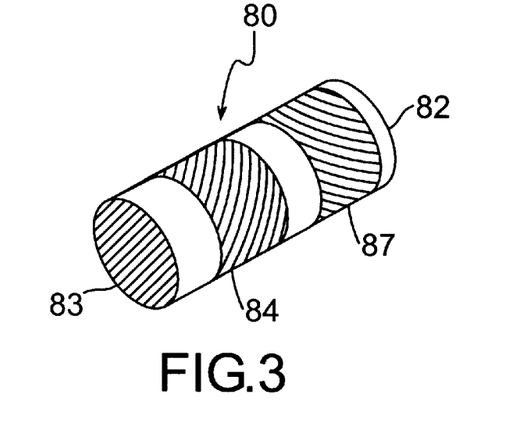
FIG. 3 is a perspective view of a portion of a shaft of the tool of FIG. 1 during manufacture and preparation of the shaft for forming a torque sensor assembly of the tool.

As shown in FIG. 3, shaft 80 of tool 10 is generally a steel spindle having drive end 82, impact end 83 and knurled regions 84 and 87. Now referring to FIG. 1, impact end 83 is releasably connected to impact assembly 92, which is a conventional type well known to those in the industry and commonly referred to as an Ingersoll-Rand impact drive assembly. Impact assembly 92 is further attached to and driven by air motor 90. When in operation, air motor 90 contacts impact assembly 92, causes it to rotate at high speed about its centerline axis. Centrifugal force causes impact assembly 92 to contact impact end 83 and rotate shaft 80 about its longitudinal axis.

Again referring to FIG. 3, knurled region 84 consists of a 45 degree single knurl cut into shaft 80. Knurled region 87 consists of a negative 45 degree single knurl cut into shaft 80, i.e, upon a cutting axis at 45 degrees to the axis of elongation of shaft 80. Knurled regions 84 and 87 thus form circumferential surface ridges along the outer surface of shaft 80.

Shaft 80 is preferably made of a low carbon steel alloy. Drive end 82 and impact end 83 of shaft 80 are heat treated to a hardness of Rockwell Rc 45 to a depth of between 0.040 and 0.060 inches. Knurled regions 84 and 87 are not heat treated and are maintained at a hardness of Rockwell Rc 30 or less.

Figure 4:
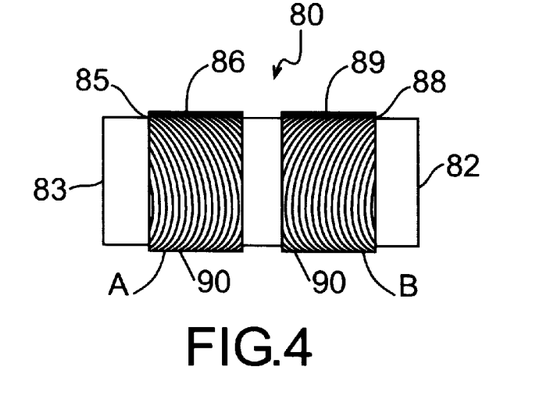
FIG. 4 is a horizontal cross-section of the shaft portion showing features of the shaft portion which make up the torque sensor assembly.

Polymer film 86 and 89 is wrapped around shaft 80 at knurled regions 84 and 87, respectively, as is shown in FIG. 4. Preferably, film 86 and 89 consists of a single wrap around shaft 80 with a small overlap to ensure adhesion to shaft 80. Preferably, film 86 and 89 is wrapped around shaft 80 under a constant tensile force to ensure uniformity in electromagnetic signal output when shaft 80 is torqued. Once joined, knurled region 84 and film 86 are sometimes referred to as region A, and film 89 and knurled region 87 are sometimes referred to as region B. For example, but not intended as a limitation, film 86 and 89 can be made of ferrious oxide, such as found in common VHS film. For example, but not intended as a limitation, film 86 and 89 could be made of various alloys of aluminum, nickel or cobalt or certain ceramic materials with magnetostrictive properties.

An epoxy resin layer 85 and 88 is deposited on film 86 and 89, respectively, just prior to wrapping and acts as a cohesive, binding film 86 and 89 to shaft 80. Preferably, resin layers 85 and 88 are deposited in an extremely thin layer. Epoxy resin layers 85 and 88 also act to improve the durability of film 86 and 89 and the film's ability to produce an electromagnetic signal when shaft 80 is placed in torque The resinous material used is preferably a common epoxy, or other acceptable binding agent that does not limit or impede the magnetostrictive properties of regions A and B, while at the same time ensures the adhesion of film 86 and 89 to shaft 80. Alternatively, regions A and B can be prepared using rare earth ceramic materials or other acceptable metallic alloy to improve the magnetostrictive properties of film 86 and 89. Preferably, ceramic material if used, would be deposited on shaft 80 through a well known procedure of electron beam deposition. As such, regions A and B of shaft 80 have magnetostrictive characteristics that can be easily measured using common TTL and CMOS electronic circuitry.

Preferably, film 86, 89 is provided with apertures 91 over its surface entirety to further establish defined lines of stress and to promote a stronger electromagnetic signal when shaft 80 is subjected to torque. For example, but not intended as a limitation, apertures 91 are preferably round or square in shape, are approximately 500 microns in diameter or across, and are preferably spaced approximately ten millimeters apart. In operation, apertures 91 of film 86, 89 enhance the magnetostrictive properties of regions A and B.

Figure 5:
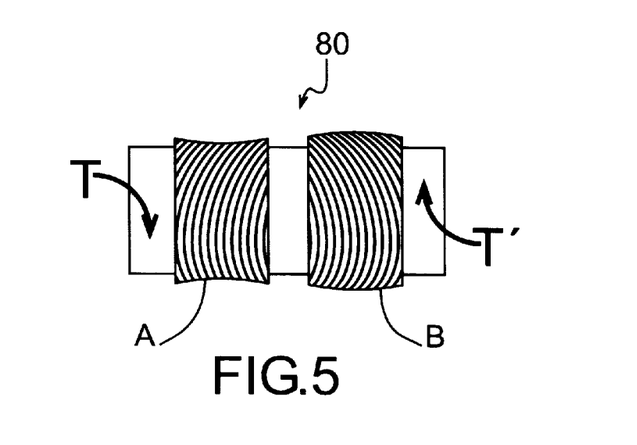
FIG. 5 is a horizontal cross-section of the shaft in torque showing, in greatly exaggerated detail, the physical changes of the shaft and its members caused by the stresses of torque loading.

As shaft 80 is placed in torque, as during the application of torque by the tool to a workpiece, as in tightening a workpiece, regions A and B are subjected to opposite twisting forces as shown by arrows T and T' in FIG. 5. The twisting under torque of shaft 80 causes the surface of knurled region 84 (corresponding to region A) to change slightly, which places film 86 in tensile stress as the circumferal ridges of knurled region 84 are stretched. The magnetostrictive nature of film 86, while in tension, makes it more permeable to magnetic fields. Conversely, knurled region 87 (corresponding to region B) is placed in compressive stress when shaft 80 is torqued, causing film 89 to become less permeable to magnetic fields. The change in surface deformation of regions A and B of shaft 80 is always opposite and, for the most part, linear to the amount of torque applied to shaft 80.

Shaft 80, prepared as noted above with film 86 and 89, will have unique magnetic permeability properties. Accordingly, each shaft 80 so manufactured must be calibrated to determine the magnetic permeability differential in regions A and B for a range of torque levels for the torque range of the tool. The relation of torque to magnetic permeability for each shaft 80 wills be a slightly nonlinear function. The calibration measurements are, at the time they are taken, converted into a unique signature algorithm and are burned or programmed into a programmable read only memory PROM or other suitable memory or look-up table of an integrated circuit microprocessor MP contained within the control module 130, shown in FIG. 7 and as more fully explained below.

As shown by FIG. 1, Magnetostrictive sensor assembly 110 is annular, preferably being generally donut shaped with a large diameter centrally located aperture suitably sized to accept the chosen diameter of shaft 80 (including the added diameter caused by the wrapping of film 86 and 89 about shaft 80) when tool 10 is assembled and operational. Shaft 80 and its film regions 86, 89 are positioned inside magnetostrictive sensor assembly 110 so that the interior surface of magnetostrictive sensor assembly 110 is never contacted by shaft 80 or film regions 86, 89. Rather, the maximum diameter of the combination of shaft 80 and film regions 86, 89 is slightly less than the minimum diameter of the aperture formed in magnetostrictive sensor assembly 110.

Figure 6:
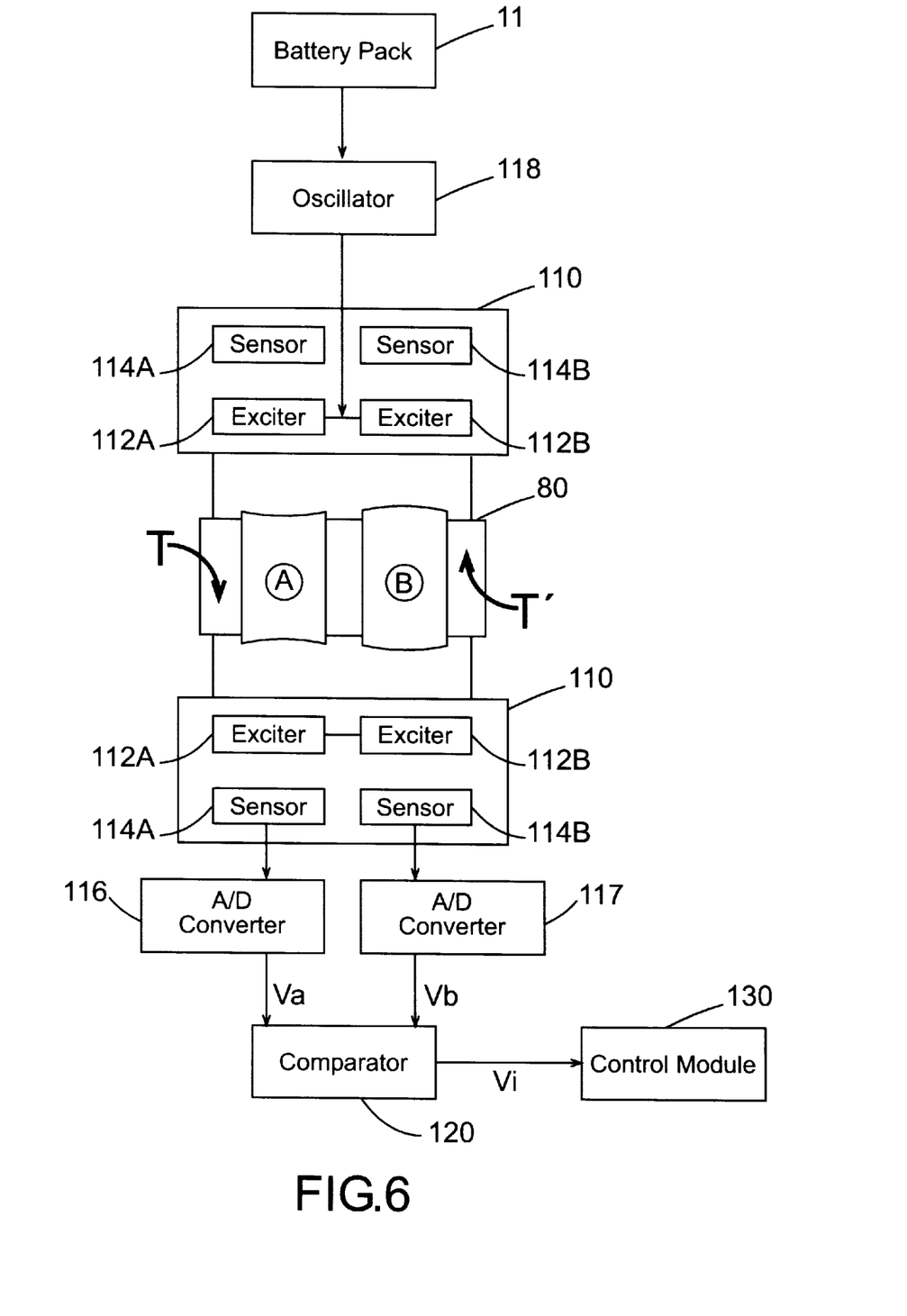
FIG. 6 is a circuit schematic diagram of the magnetostrictive sensor assembly with the shaft of FIG. 5, which sensor is interconnected with a control module.

Referring to FIG. 6, magnetostrictive sensor assembly 110 is comprised generally of source or exciter coils 112A and 112B, corresponding sensor coils 114A and 114B, analog-to-digital (A/D) converters 116 and 117, an oscillator 118 and a voltage comparator 120. Exciter coils 112A, 112B and sensor coils 114A, 114B are axially aligned within sensor assembly 110 along shaft 80 such that the designation "A" corresponds to region A, and designation "B" corresponds to region B. Accordingly, exciter coil 112A and sensor coil 114A are positioned over region A when tool 10 is fully assembled. Oscillator 118, of a common type well known to those in the industry, is connected to a power source, such as battery pack 11, and produces an electric current pulsed to exciter coils 112A and 112B, which in turn produce a magnetic field around regions A and B. The magnetic field thus produced induce an electric current in sensor coils 114A and 114B which runs to A/D converters 116 and 117, respectively, which digitize the electric signal current received from sensor coils 114A and 114B (respectively), and generates signals Va and Vb, respectively, which are received by voltage comparator 120 of a common type well know to those in the industry. The voltage comparator 120 then compares Va against Vb and amplifies the resultant voltage Vi and provides Vi to control module 130.

Again referring to FIG. 1, key pad and display unit 140 is an electronic digital controller fixedly attached to casing 21 by tab 148 and flange 142. Unit 140 consists primarily of a keypad 144 and a digital display 146, which are electronically linked to control module 130 in a conventional manner well known to those in the industry. Before operating tool 10, the user of tool 10 elects the torque level desired for the workpiece. The user inputs the torque level desired, designated in FIG. 7 by Tm, by depressing certain of the pads of keypad 144. The user's input is immediately displayed by digital display 146. After the torque level Tm has been entered by the user, control module 130 reads Tm and uses Tm as the limiting factor in the algorithm stored in the processing integrated circuit.

Figure 7:
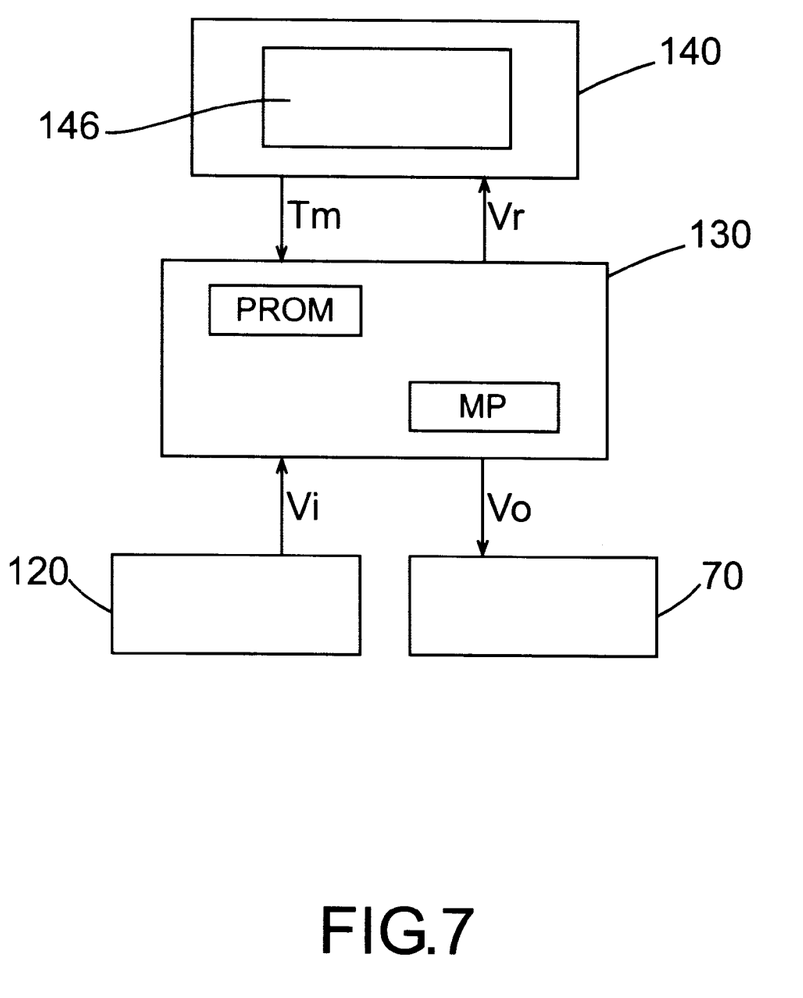
FIG. 7 is a circuit schematic diagram of the control module and its connections with a key pad and display unit, the magnetostrictive sensor assembly and the solenoid assembly.

Referring to FIG. 7, control module 130 is electronically linked to comparator 120, keypad and display 140 and solenoid assembly 70. Control module 130 consists primarily of a processing integrated circuit MP with its associated memory PROM. As noted above, when tool 10 is in operation, comparator 120 sends signal Vi to control module 130. After being received, Vi is input to the unique algorithm burned into the ROM of the integrated circuit, which computes the corresponding torque level and creates an output signal Vr which is electronically sent to keypad and display unit 140, which in turn reads Vr and displays the corresponding torque level on display 142. When the corresponding torque level of Vi reaches the preset torque limit Tm, contole module 130 send and electronic signal Vo (preferably a pulse of 600 ms, 12 Vdc) to solenoid assembly 70 energizing solenoid 72.

Operation is as follows:

As shown in FIGS. 5 and 6, as torque is supplied to shaft 80, region A is placed in tensile stress and region B is placed in compressive stress. The resultant change in the magnetic permeability of film 86 and 89 alters the magnetic filed detected by sensor coils 114A and 114B, respectively, as a negative or positive difference, depending upon the torque direction. After A/D converters 116 and 117 digitize the resultant current produced in sensor coils 1114A and 114B, respectively, comparator 120 measures Va against Vb and amplifies the resultant Vi and provides Vi as a zero volt to a plus-or-minus 2 volt signal to control module 130, depending upon the differential between Va and Vb. To correct the sensor for measurement error between zero and span, control module 130 causes each sensor to be tested and mapped at ten data points of known torque values, as shown in FIG. 7. Through linear interpolation, the signature curve is or stored into the circuit memory PROM as a data table. During power-up of the control module 130, a calibration process reads the signature curve data and applies an inverse of this signal to normalize the curve. Zero and span are also calibrated during this process. These features are transparent to the user during normal operation, who need not see the calibration taking place. Periodically the user may preferably be required to "zero" the sensor, by use of the keypad, to compensate for changes of temperature during operation. A zero function is provided as a menu feature of the control panel.

Accordingly, the torque provided to the work piece is monitored directly from shaft 80. As such, the actual torque provided to the workpiece can be measured and provided to control module 130 for processing.

After being received by control module 130, Vi is input to the unique algorithm 15 burned into the ROM of the integrated circuit. When the corresponding torque level of Vi reaches the preset torque limit Tm, contole module 130 send and electronic signal Vo to solenoid assembly 70 energizing solenoid 72. Within 200 ms, solenoid 72 pulls in, causing rod 77 to pull down release plunger 75 and compressing return spring 73. As release plunger 75 is retracted, release balls 39 are displaced from trigger recess 28, forced into solenoid bore 24 and away from stem 41 and trigger stem 33 by pressurized air that has flowed from air bore 25 into trigger recess 28.

With release balls 39 withdrawn from trigger stem bore 28, valve 52 is biased closed by spring 58, effectively cutting off the pressurized air supplied to power air motor 90. This prevents the trigger from continuing to cause the air valve to supply air to the motor. Accordingly, when the air source is disrupted, the air to air motor 90 is immediately cut off so that shaft 80, coupling the output of air motor 90 to the workpiece, will not deliver torque to workpiece substantially exceeding the predetermined torque limit Tm. As tip valve 52 is forced closed by spring 58, valve stem 56 slidably forces stem 41 into trigger stem recess 28, and trigger button 31, through pressure from the user's finger, is fully depressed forcing trigger stem 33 to effectively block the opening between solenoid bore 24 and trigger stem recess 28. Solenoid return spring 73 biases release balls 39 against the bottom of trigger stem 33 and applies a benign force to release balls 39 until the user releases trigger button 31 which, with aid from trigger button spring 43, opens the gap between trigger stem 33 and stem 41, allowing release balls 39, through force of solenoid return spring 73, to align themselves between trigger stem 33 and stem 41, resetting the system for another operation.

In view of the foregoing description of the present invention, it will be seen that the several objects of the invention are achieved and other advantages are attained.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the claims and their equivalents.

What is claimed is:

1. A torque-responsive, automatically torque-controlling pneumatic impact-type torque tool of portable character, comprising:

a portable housing for hand-held use;

a pneumatic motor within the housing for being powered by a source of pressurized gas, an output shaft from the motor, and a coupling at a forward portion of the output shaft for coupling torque from the output shaft to a workpiece to which it is desired to apply torque to a predetermined torque value by rotation of the output shaft;

an impact mechanism for coupling torque from the output shaft to the workpiece;

a motor control within the housing having a trigger for permitting an operator to selectively supply gas from a source to the motor for its operation;

a magnetorestrictive torque sensor within the housing and associated with the output shaft for systematically measuring the amount of torque being applied by the shaft as it supplies torque to the workpiece via the impact mechanism, the torque sensor comprising (a) multiple magnetic permeability regions in the form a pair of bands of magnetostrictive material exhibiting magnetic permeability, the bands being carried coaxially by the output shaft and spaced along a length of the output shaft, magnetic field-producing means for producing an external magnetic field around these regions, said regions providing respectively different magnetic responses when the shaft is delivering torque to the workpiece, each band of magnetostrictive material being constituted by at least a single wrap of film material wrapped coaxially about the output shaft; and (b) magnetic sensing means for magnetically sensing the different magnetic responses to indicate thereby the torque delivered to the workpiece, the magnetic permeability of the bands differentially varying in response to the torque delivered to the workpiece, the magnetic sensing means magnetically sensing the differential varying of the magnetic of the bands;

a torque control input carried by the housing permitting the operator to select a predetermined torque value to be delivered to the workpiece;

a torque control circuit interconnected with the torque control input and the torque sensor operating to compare the torque being applied to the output shaft with the predetermined torque value;

and an air control within the housing operating to prevent pressurized gas from being supplied to the motor by the motor control and thus shutting off the motor to prevent application of further torque to the workpiece when the torque supplied to the shaft reaches the predetermined torque value as torque is being applied to the workpiece;

whereby the tool applies to the workpiece torque at substantially no more than the predetermined level.

2. A pneumatic torque tool of portable character as set forth in claim 1 wherein the magnetic field-producing means comprises exciter coils in proximity to the bands, and the magnetic sensing means comprises sensor coils in proximity to the bands, the varying the magnetic characteristic of the bands producing a differential in electric current induced in the sensor coils, which differential is a function of the torque delivered to the workpiece.

3. A pneumatic torque tool of portable character as set forth in claim 1 wherein the film material is metal oxide-coated polymeric film wrapped upon respective knurled regions of the output shaft.

4. A torque-responsive, automatically torque-controlling pneumatic torque tool of portable character, comprising:

a portable housing for hand-held use;

a pneumatic motor within the housing for being powered by a source of pressurized gas, an output shaft from the motor, and a coupling at a forward portion of the output shaft for coupling torque from the output shaft to a workpiece to which it is desired to apply torque to a predetermined torque value by rotation of the output shaft;

a motor control within the housing having a trigger for permitting an operator to selectively supply gas from a source to the motor for its operation;

a magnetorestrictive torque sensor within the housing and associated with the output shaft for systematically measuring the amount of torque being applied by the shaft as it supplies torque to the workpiece, the torque sensor comprising (a) multiple magnetic permeability regions in the form a pair of bands of magnetostrictive material exhibiting magnetic permeability, the bands being carried coaxially by the output shaft and spaced along a length of the output shaft, magnetic field-producing means for producing an external magnetic field around these regions, said regions providing respectively different magnetic responses when the shaft is delivering torque to the workpiece, the bands of material being respectively constituted by at least a single wrap of said film material wrapped coaxially about the output shaft; and (b) magnetic sensing means for magnetically sensing the different magnetic responses to indicate thereby the torque delivered to the workpiece, the magnetic permeability of the bands differentially varying in response to the torque delivered to the workpiece, the magnetic sensing means magnetically sensing the differential varying of the magnetic permeability of the bands;

a torque control input carried by the housing permitting the operator to select a predetermined torque value to be delivered to the workpiece;

a torque control circuit interconnected with the torque control input and the torque sensor operating to compare the torque being applied to the output shaft with the predetermined torque value;

and an air control within the housing operating to prevent pressurized gas from being supplied to the motor by the motor control and thus shutting off the motor to prevent application of further torque to the workpiece when the torque supplied to the shaft reaches the predetermined torque value as torque is being applied to the workpiece;

whereby the tool applies to the workpiece torque at substantially no more than the predetermined level.

5. A pneumatic torque tool of portable character as set forth in claim 4 wherein the film material is metal oxide-coated polymeric film wrapped upon respective knurled regions of the output shaft.

\* \* \* \* \*